US009021285B2

(12) United States Patent
Choi et al.

(10) Patent No.: US 9,021,285 B2
(45) Date of Patent: Apr. 28, 2015

(54) COMPUTING DEVICE NEGOTIATING WITH A PROXY DEVICE TO CONTROL SLEEP MODE AND ACHIEVING ENERGY SAVING

(75) Inventors: Jin Hyeock Choi, Suwon-Si (KR); Byung Chang Kang, Yongin-si (KR); Jong Ho Bang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 274 days.

(21) Appl. No.: 13/527,925

(22) Filed: Jun. 20, 2012

(65) Prior Publication Data

US 2012/0331323 A1 Dec. 27, 2012

(30) Foreign Application Priority Data

Jun. 22, 2011 (KR) ........................ 10-2011-0060609

(51) Int. Cl.
*G06F 1/00* (2006.01)
*G06F 1/32* (2006.01)

(52) U.S. Cl.
CPC .................................. *G06F 1/3203* (2013.01)

(58) Field of Classification Search
CPC ....... G06F 1/3203; G06F 1/3209; G06F 1/32; G06F 1/3284; H04B 7/00
USPC ........................................................ 713/323
See application file for complete search history.

(56) References Cited

U.S. PATENT DOCUMENTS

| | | | | |
|---|---|---|---|---|
| 5,787,459 A * | 7/1998 | Stallmo et al. | ................. | 711/112 |
| 7,506,188 B2 * | 3/2009 | Krantz et al. | ................. | 713/320 |
| 8,102,790 B1 * | 1/2012 | Trehus | ........................... | 370/311 |
| 8,566,594 B2 * | 10/2013 | Soliman et al. | ............... | 713/171 |
| 2002/0083172 A1 * | 6/2002 | Knowles et al. | .............. | 709/225 |
| 2004/0047322 A1 * | 3/2004 | O'Neill | ........................ | 370/338 |
| 2004/0255170 A1 * | 12/2004 | Yang et al. | ..................... | 713/300 |
| 2006/0029024 A1 * | 2/2006 | Zeng et al. | ..................... | 370/335 |
| 2006/0053290 A1 * | 3/2006 | Randle et al. | ................. | 713/169 |
| 2006/0073851 A1 * | 4/2006 | Colando et al. | ............... | 455/566 |
| 2006/0079206 A1 * | 4/2006 | Kim | .............................. | 455/411 |
| 2006/0101109 A1 * | 5/2006 | Nishio | .......................... | 709/200 |
| 2006/0129703 A1 * | 6/2006 | Oshikawa et al. | .............. | 710/14 |
| 2006/0265473 A1 * | 11/2006 | Muto | ........................... | 709/218 |
| 2007/0092203 A1 * | 4/2007 | Iwata et al. | ..................... | 386/83 |
| 2007/0130427 A1 * | 6/2007 | Lahti et al. | ..................... | 711/133 |
| 2007/0218939 A1 * | 9/2007 | Lim et al. | ...................... | 455/528 |
| 2007/0238439 A1 * | 10/2007 | Alon et al. | ................. | 455/343.2 |
| 2007/0274244 A1 * | 11/2007 | Yoon et al. | ..................... | 370/311 |
| 2007/0297438 A1 * | 12/2007 | Meylan et al. | ................ | 370/445 |
| 2008/0095092 A1 * | 4/2008 | Kim | .............................. | 370/311 |

(Continued)

FOREIGN PATENT DOCUMENTS

| | | | |
|---|---|---|---|
| JP | 2010-124231 A | 6/2010 | |
| JP | 2010-219604 A | 9/2010 | |

(Continued)

*Primary Examiner* — Thomas Lee
*Assistant Examiner* — Santosh R Poudel
(74) *Attorney, Agent, or Firm* — NSIP Law

(57) ABSTRACT

A system for saving energy through control of a sleep mode, and a method of operating the system are provided. The energy-saving system may enable a proxy device to maintain a minimum basic setup necessary for a communication when a host device enters a sleep mode, and may omit an operation performed based on the basic setup when the host device switches to a communication mode, thereby enabling a smooth switch between the sleep mode and the communication mode.

19 Claims, 4 Drawing Sheets

(56) References Cited

U.S. PATENT DOCUMENTS

| | | | |
|---|---|---|---|
| 2008/0098241 A1* | 4/2008 | Cheshire | 713/300 |
| 2008/0182567 A1* | 7/2008 | Zhu et al. | 455/418 |
| 2008/0267104 A1* | 10/2008 | Zhang | 370/311 |
| 2008/0279131 A1* | 11/2008 | Malladi et al. | 370/311 |
| 2008/0295170 A1* | 11/2008 | Gupta et al. | 726/22 |
| 2009/0117927 A1* | 5/2009 | Li et al. | 455/466 |
| 2009/0168678 A1* | 7/2009 | Han et al. | 370/311 |
| 2009/0199037 A1* | 8/2009 | Venkatesh et al. | 713/502 |
| 2009/0210519 A1* | 8/2009 | Zill et al. | 709/220 |
| 2009/0219832 A1* | 9/2009 | Velev et al. | 370/254 |
| 2009/0221261 A1* | 9/2009 | Soliman | 455/343.2 |
| 2009/0274102 A1* | 11/2009 | O'Neill | 370/328 |
| 2009/0310607 A1* | 12/2009 | Evans | 370/389 |
| 2010/0008279 A1* | 1/2010 | Jeon et al. | 370/311 |
| 2010/0039974 A1* | 2/2010 | Toshimitsu et al. | 370/311 |
| 2010/0040011 A1* | 2/2010 | Kang et al. | 370/329 |
| 2010/0125742 A1* | 5/2010 | Ohtani | 713/310 |
| 2010/0125744 A1* | 5/2010 | Hong | 713/323 |
| 2010/0156666 A1* | 6/2010 | Choi et al. | 340/870.07 |
| 2010/0203905 A1* | 8/2010 | Chaubey et al. | 455/458 |
| 2010/0208724 A1* | 8/2010 | Booth et al. | 370/352 |
| 2010/0235668 A1 | 9/2010 | Cheshire | |
| 2011/0002253 A1* | 1/2011 | Cha et al. | 370/311 |
| 2011/0029659 A1* | 2/2011 | Shah | 709/224 |
| 2011/0078465 A1* | 3/2011 | Ito | 713/300 |
| 2011/0082939 A1* | 4/2011 | Montemurro et al. | 709/227 |
| 2011/0082940 A1* | 4/2011 | Montemurro et al. | 709/227 |
| 2011/0119510 A1* | 5/2011 | Ahn | 713/323 |
| 2011/0126037 A1* | 5/2011 | Jin et al. | 713/323 |
| 2011/0142039 A1* | 6/2011 | Jung | 370/389 |
| 2011/0191610 A1* | 8/2011 | Agarwal et al. | 713/310 |
| 2011/0299454 A1* | 12/2011 | Krishnaswamy | 370/328 |
| 2012/0069827 A1* | 3/2012 | Lee et al. | 370/338 |
| 2012/0072751 A1* | 3/2012 | Das et al. | 713/323 |
| 2012/0076011 A1* | 3/2012 | Gobriel et al. | 370/252 |
| 2012/0083200 A1* | 4/2012 | Koh et al. | 455/7 |
| 2012/0102084 A1* | 4/2012 | Hiltunen et al. | 709/201 |
| 2012/0122511 A1* | 5/2012 | Antonio et al. | 455/522 |
| 2012/0151028 A1* | 6/2012 | Lu et al. | 709/223 |
| 2012/0302239 A1* | 11/2012 | Hu et al. | 455/436 |
| 2013/0042246 A1* | 2/2013 | Berry | 718/102 |
| 2013/0089015 A1* | 4/2013 | Choong | 370/311 |
| 2013/0332762 A1* | 12/2013 | Meirosu et al. | 713/323 |
| 2014/0161118 A1* | 6/2014 | Iyer et al. | 370/351 |

FOREIGN PATENT DOCUMENTS

| | | |
|---|---|---|
| KR | 10-0872254 | 12/2008 |
| KR | 10-2011-0014511 A | 2/2011 |

\* cited by examiner

FIG. 3

| PROXY SLEEP REQUEST 301 | |
|---|---|
| SLEEP PERIOD 303 | REQUESTED SLEEP POLICY 305 |

| PROXY SLEEP REPLY 307 | |
|---|---|
| CODE 309 | PROVIDED SLEEP POLICY 311 |

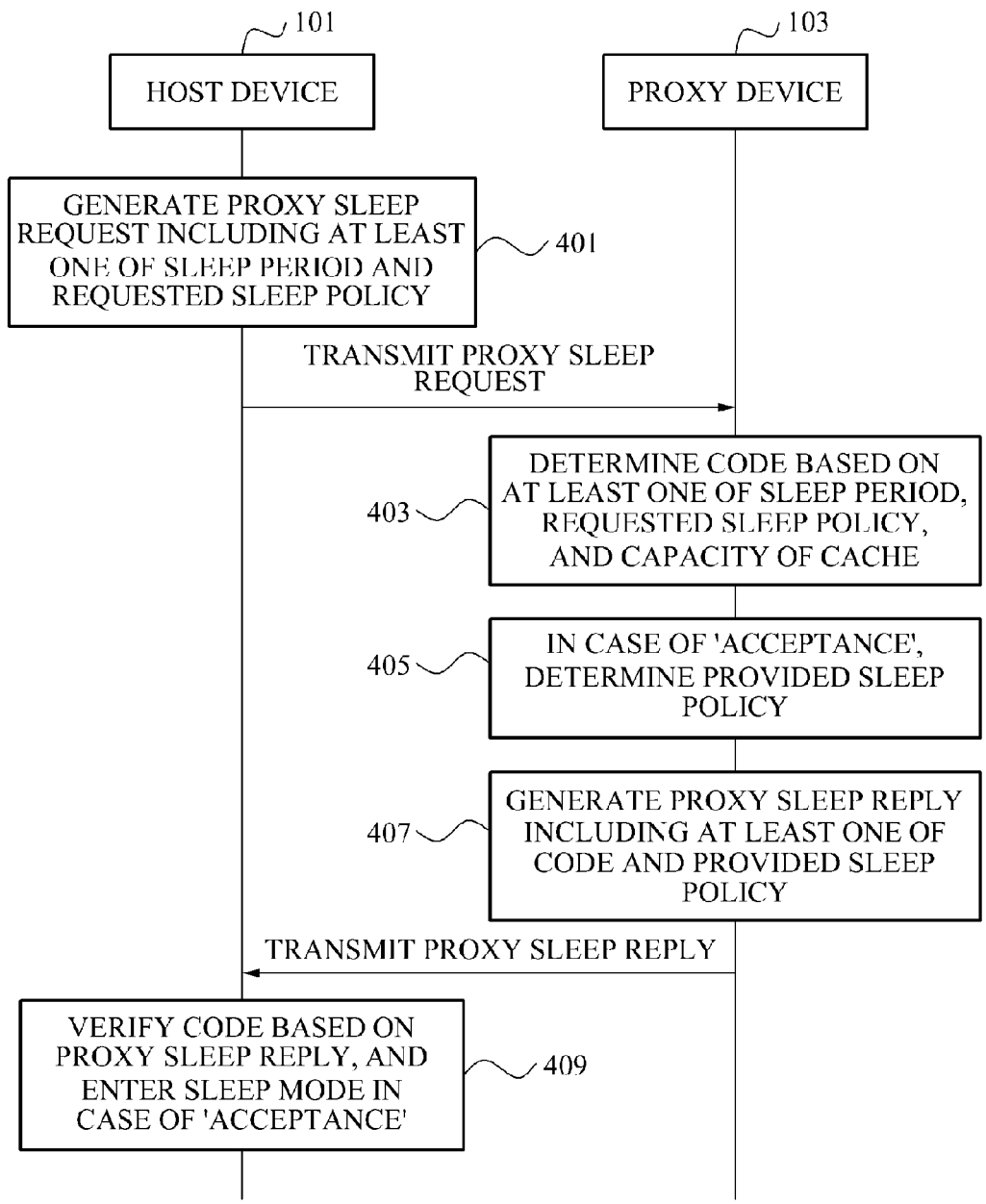

COMPUTING DEVICE NEGOTIATING WITH A PROXY DEVICE TO CONTROL SLEEP MODE AND ACHIEVING ENERGY SAVING

CROSS-REFERENCE TO RELATED APPLICATION(S)

This application claims the benefit under 35 U.S.C. §119 (a) of Korean Patent Application No. 10-2011-0060609, filed on Jun. 22, 2011, in the Korean Intellectual Property Office, the entire disclosure of which is incorporated herein by reference for all purposes.

BACKGROUND

1. Field

The following description relates to an energy-saving technology for a host device that switches between a sleep mode and a communication mode.

2. Description of Related Art

In an 'Internet of Things' communication environment, various communication devices are operated through a connection to a network. These communication devices may include, for example, a mobile terminal, a television (TV), a tablet, an appliance, and the like. In this example, the communication devices may perform a communication, for example, based on an Internet Protocol version 6 (IPv6), and may be constantly set in an on mode in which the communication devices are constantly operated for high performance.

An energy-saving method may be used to enable a communication device to operate in a sleep mode in which little power is used when there are no tasks to be processed, and may enable the communication device to wake up to operate in a communication mode, and perform a task when there is a task to be processed.

However, this method is improper for IPv6-based communication devices. For example, if a communication device enters a sleep mode, an error may occur in a setup necessary for a communication, for example, an address, router information, and the like. The error may cause an inconvenience of performing a new communication setting process when the communication device wakes up and switches to a communication mode. Thus, a smooth transition between the sleep mode and the communication mode is difficult in IPv6.

SUMMARY

In one general aspect, there is provided a host device that is configured to save energy through control of a sleep mode, the host device including an interface configured to receive, as an input, a requested sleep policy to be performed by a proxy device, and to provide, to the proxy device, a proxy sleep request comprising the requested sleep policy, and a processor configured to extract, from a proxy sleep reply, information about whether the proxy sleep request is accepted by the proxy device, and to enter the sleep mode if the proxy sleep request is accepted.

The processor may be further configured to extract a sleep policy provided by the proxy device from the proxy sleep reply, and to display the provided sleep policy.

The interface may be configured to receive, as an input, a sleep period indicating a duration that the sleep mode is to be maintained, and to provide the input sleep period to the proxy device by incorporating the sleep period into the proxy sleep request, and the processor may be configured to maintain the sleep mode for the duration of the sleep period, and switch to a communication mode in response to the sleep period expiring or a wake-up request being received from the proxy device.

In another aspect, there is provided a proxy device that is configured to save energy through control of a sleep mode, the proxy device including a determination unit configured to extract a requested sleep policy from a proxy sleep request received from a host device, and to determine whether to accept the proxy sleep request based on at least one of the requested sleep policy extracted from the proxy sleep request and an available capacity of a cache, and a controller configured to provide, to the host device, a proxy sleep reply comprising information about whether the proxy sleep request is accepted.

The determination unit may be configured to extract, from the proxy sleep request, a sleep period indicating a duration that the sleep mode is to be maintained, and to determine whether the proxy sleep request is accepted based on the sleep period.

In response to the proxy sleep request being accepted, the determination unit may be further configured to determine a sleep policy to provide to the host device when the host device enters the sleep mode, and the controller may be configured to provide the proxy sleep reply to the host device by incorporating the provided sleep policy into the proxy sleep reply.

In response to the provided sleep policy being determined to be a default sleep policy, the controller may be configured to perform a default operation including at least one of Duplicate Address Detection (DAD) and Neighbor Unreachability Detection (NUD).

In response to a packet being received, the controller may be configured to transmit a wake-up request to the host device, and transfer the packet to the host device in response to the host device switching to a communication mode.

In response to the determination unit determining to provide a caching sleep policy, the controller may be configured to perform a default operation including at least one of DAD and NUD, and the controller may be configured to cache a packet, in response to the packet being received.

The controller may be configured to transfer the cached packet to the host device, in response to the host device switching to a communication mode at the expiration of the sleep period, and/or the controller may be configured to transmit a wake-up request to the host device, and transfer the cached packet to the host device having switched to the communication mode in accordance with the wake-up request.

The controller may be configured to transmit the wake-up request in response to an available capacity of a cache storing the cached packet being less than a predetermined amount.

In response to the determination unit determining to provide a semi-caching sleep policy, the controller may be configured to perform a default operation including at least one of DAD and NUD, and the controller may be configured to cache a packet other than a real-time data packet.

In response to the real-time data being received, or in response to an available capacity of a cache storing the cached packet being less than a predetermined amount, the controller may be configured to transmit a wake-up request to the host device, and transfer the second packet to the host device having switched to a communication mode in accordance with the wake-up request.

In another aspect, there is provided a method of a host device that is configured to save energy through control of a sleep mode, the method including receiving, as an input, a requested sleep policy to be performed by a proxy device, and providing, to the proxy device, a proxy sleep request comprising the requested sleep policy, and extracting, from a proxy sleep reply, information about whether the proxy sleep request is accepted by the proxy device, and entering the sleep mode if the proxy sleep request is accepted.

The method may further comprise extracting a sleep policy provided by the proxy device from the proxy sleep reply, and displaying the provided sleep policy.

The method may further comprise receiving, as an input, a sleep period indicating a duration that the sleep mode is to be maintained, and providing the input sleep period to the proxy device by incorporating the sleep period into the proxy sleep request, and maintaining the sleep mode for the duration of the sleep period, and switching to a communication mode in response to the sleep period expiring or a wake-up request being received from the proxy device.

In another aspect, there is provided a method of a proxy device that is configured to save energy through control of a sleep mode, the method including extracting a requested sleep policy from a proxy sleep request that is received from a host device, and determining whether to accept the proxy sleep request based on at least one of the requested sleep policy extracted from the proxy sleep request, and an available capacity of a cache, and providing, to the host device, a proxy sleep reply including information about whether the proxy sleep request is accepted.

The determining may comprise extracting, from the proxy sleep request, a sleep period indicating a duration that the sleep mode is to be maintained, and determining whether the proxy sleep request is accepted based on the sleep period.

The method may further comprise determining a sleep policy to provide the host device when the host device enters the sleep mode, in response to the proxy sleep request being accepted, wherein the providing comprises providing the proxy sleep reply to the host device by incorporating the provided sleep policy into the proxy sleep reply.

Other features and aspects may be apparent from the following detailed description, the drawings, and the claims.

BRIEF DESCRIPTION OF THE DRAWINGS

FIG. 3 is a diagram illustrating an example of a proxy sleep request and a proxy sleep reply.

FIG. 4 is a diagram illustrating an example of a method of operating a host device and a proxy device that may save energy through control of a sleep mode.

Figure 1:
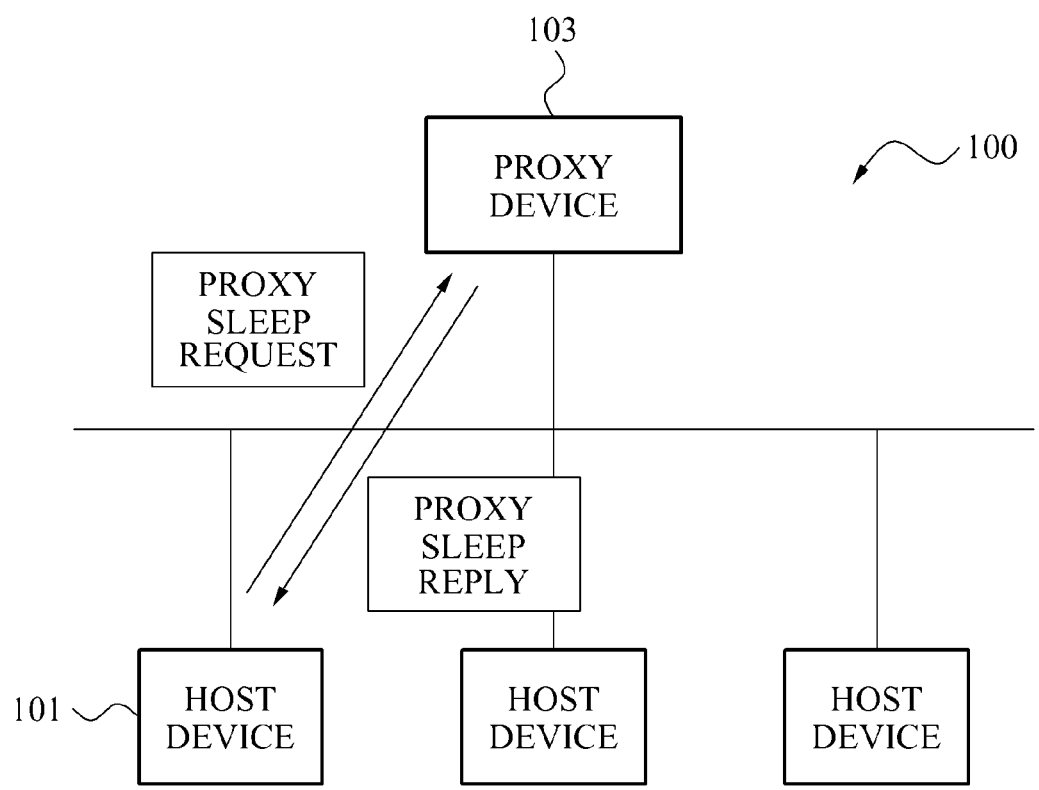
FIG. 1 is a diagram illustrating an example of a system for saving energy through control of a sleep mode.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

According to various examples, a system for saving energy through control of a sleep mode may perform a communication based on an Internet Protocol version 6 (IPv6). However, the system is not limited IPv6.

By enabling a proxy device to maintain a minimum basic setup necessary for communication when a host device enters a sleep mode, and by omitting a basic setup operation when the host device switches to a communication mode, it is possible to resolve an inconvenience that is experienced when performing the operation. Accordingly, a smooth and faster transition between the sleep mode and the communication mode is possible, and energy saving may be increased.

FIG. 1 illustrates an example of a system for saving energy through control of a sleep mode.

Referring to FIG. 1, energy-saving system 100 includes a host device 101 and a proxy device 103 that may save energy through control of a sleep mode. For example, the host device 101 may be a node such as a terminal. For example, the proxy device 103 may also be a node such as a router.

The host device 101 may be operated in a communication mode and in a sleep mode. The host device 101 may be operated generally in the communication mode. The host device 101 may save energy by entering the sleep mode in response to a sleep request transmitted to the proxy device 103 being accepted by the proxy device 103. For example, the host device 101 may enter sleep mode in response to an 'acceptance' being received from the proxy device 103 as a response to the sleep request. However, if the sleep request is refused by the proxy device 103, for example, if a 'refusal' is received from the proxy device 103, the host device 101 may transmit the sleep request to another proxy device.

In this example, the host device 101 may select a default router, or a node on the same link of the host device, as the proxy device 103.

The host device 101 may transmit a sleep request to the proxy device 103. In some examples, the host device 101 may also transmit a sleep period indicating the duration that the sleep mode is to be maintained and/or a requested sleep policy desired to be performed by the proxy device 103, along with the sleep request. For example, the requested sleep policy may correspond to one of a default sleep policy, a caching sleep policy, a semi-caching sleep policy, and the like.

The host device 101 may enter the sleep mode. The host device 101 may switch to the communication mode, for example, if the sleep period expires or if a wake-up request is received from the proxy device 103. The host device 101 having switched to the communication mode may receive, from the proxy device 103, a packet that is transmitted to the proxy device 103 during the sleep period.

In response to the host device 101 switching to the communication mode, the host device 101 may enable the proxy device 103 to maintain a minimum basic setup for a communication, thereby omitting an operation performed based on the basic setup.

The host device 101 may extract a sleep policy from the response received from the proxy device 103, and may display the sleep policy. In this example, when the requested sleep policy is different from the sleep policy provided from the proxy device 103, the host device 101 may transmit a sleep cancellation request to the proxy device 103, and may restrict an operation performed by the proxy device 103, regardless of whether the sleep request is accepted.

The proxy device 103 may provide information about whether the sleep request is accepted, for example, 'acceptance' or 'refusal', as a response to the sleep request received from the host device 101. For example, the proxy device 103 may extract, from the sleep request, at least one of the sleep period indicating an amount of time which the sleep mode is to be maintained, and the requested sleep policy desired to be performed by the proxy device 103, and may determine whether the sleep request is accepted based on at least one of the sleep period and the requested sleep policy.

In an example in which the sleep request is accepted, the proxy device 103 may determine a desired sleep policy, and may provide the sleep policy and the information about whether the sleep request is accepted. For example, the provided sleep policy may correspond to one of a default sleep policy, a caching sleep policy, a semi-caching sleep policy, and the like. The provided sleep policy may be the same as the requested sleep policy received from the host device 101, or may be different from the request sleep policy.

In an example in which the sleep request is accepted, the proxy device 103 may perform a default operation including at least one of Duplicate Address Detection (DAD) and Neighbor Unreachability Detection (NUD). In this example, the proxy device 103 may transmit a wake-up request to the host device based on a predetermined criterion compliant with the provided sleep policy, may transfer a packet received during the sleep mode to the host device 101 after the host device 101 has switched to the communication mode in accordance with the wake-up request, and may terminate the operation performed by the proxy device 103 instead of the host device 101.

In an example in which the provided sleep policy corresponds to the default sleep policy, the proxy device 103 may transmit a wake-up request to the host device 101, and may transfer a packet to the host device 101 having switched to the communication mode in accordance with the wake-up request in response to the packet being received.

In an example in which the provided sleep policy corresponds to the caching sleep policy, the proxy device 103 may cache a packet in response to the second packet being received. In this example, the proxy device 103 may transfer the cached packet to the host device 101 when the host device 101 switches to the communication mode at the expiration of the sleep period. As another example, the proxy device 103 may transmit a wake-up request to the host device 101, and may transfer the packet to the host device 101 having switched to the communication mode. For example, if an available capacity of a cache storing the cached packet is less than a predetermined amount, the proxy device may transmit a wake-up request to the host device 101 in an effort to reduce an amount of data being stored in the cache.

In an example in which the provided sleep policy corresponds to the semi-caching sleep policy, the proxy device 103 may cache a packet, excluding real-time data, and a first packet associated with the default operation. In this example, if the real-time data is received, or if an available capacity of a cache storing the cached second packet is less than a predetermined amount, the proxy device 103 may transmit a wake-up request to the host device 101, and may transfer the packet to the host device 101 having switched to the communication mode based on the wake-up request. Otherwise the proxy device 103 may store the packet in the cache until a later point in time.

In response to a sleep cancellation request being received from the host device 101, the proxy device 103 may restrict the operation performed by the proxy device 103 instead of the host device 101, for example, the default operation or the packet caching.

Figure 2:
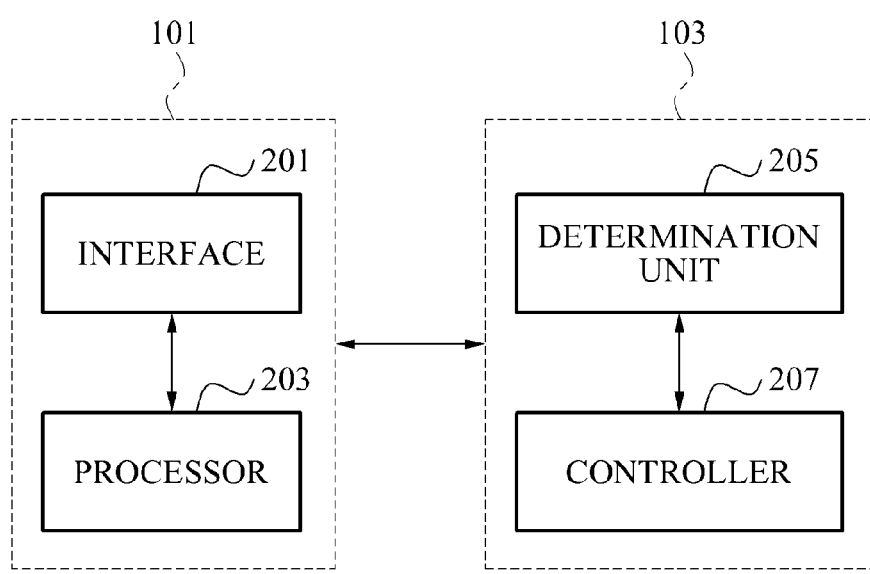
FIG. 2 is a diagram illustrating an example of a host device and a proxy device that may save energy through control of a sleep mode.

FIG. 2 illustrates an example of a host device and a proxy device that save energy through control of a sleep mode.

Referring to FIG. 2, host device 101 includes an interface 201, and a processor 203.

If the host device 101 desires to enter sleep mode, the interface 201 may receive an input such as a requested sleep policy desired to be performed by the proxy device 103, and may provide, to the proxy device, a proxy sleep request including the requested sleep policy. For example, the requested sleep policy may correspond to one of a default sleep policy, a caching sleep policy, and a semi-caching sleep polity.

In this example, the interface 201 may also receive an input of a sleep period indicating an amount of time which the sleep mode is to be maintained, and may provide the sleep period to the proxy device 103 by incorporating the sleep period into the proxy sleep request.

A proxy sleep reply may be received from the proxy device 103 as a response to the proxy sleep request. The processor 203 may extract, from the proxy sleep reply, information about whether the proxy sleep request is accepted. As an example, the information about whether the proxy sleep request is accepted may also be referred to as a code. If the code corresponds to 'acceptance', the processor 203 may enter the sleep mode. In this example, the processor 203 may also extract a provided sleep policy from the proxy sleep reply, and may display the provided sleep policy.

The processor 203 may maintain the sleep mode during the desired sleep period, and may switch to a communication mode when the sleep period expires or a wake-up request is received from the proxy device 103.

The proxy device 103 includes a determination unit 205, and a controller 207.

The determination unit 205 may extract a requested sleep policy from a proxy sleep request received from the host device 101, and may determine whether the proxy sleep request is accepted. For example, whether to accept the proxy sleep request may be determined based on at least one of the extracted requested sleep policy and an available capacity of a cache.

For example, the determination unit 205 may extract, from the proxy sleep request, a sleep period during which the host device would like to remain in sleep mode, and may determine whether the proxy sleep request is accepted, based on the sleep period.

In an example in which the proxy sleep request is accepted, the determination unit 205 may determine a sleep policy desired to be performed when the host device 101 enters the sleep mode. For example, the determination unit 205 may determine the sleep policy as one of a default sleep policy, a caching sleep policy, and a semi-caching sleep policy. The sleep policy determined by the determination unit 205 may be different than the sleep policy requested by the host device 101.

The controller 207 may provide, to the host device 101, a proxy sleep reply including information about whether the proxy sleep request is accepted. For example, the controller 207 may provide the proxy sleep reply to the host device 101 by incorporating the provided sleep policy into the proxy sleep reply.

If the proxy sleep request is accepted, the controller 207 may perform a default operation including at least one of a duplicate address detection (DAD) and a neighbor unreachability detection (NUD), irrespective of the provided sleep policy. That is, the controller may perform the default operation when the provided sleep policy is determined to be one of the default sleep policy, the caching sleep policy, and the semi-caching sleep policy.

Various examples are described herein for the provided sleep policy. In some examples, it is assumed that a first packet is received via the default sleep policy, but the examples are not limited thereto. For example, the first packet may be received through any desired sleep policy.

In an example in which the provided sleep policy corresponds to the default sleep policy, the controller 207 may transmit a wake-up request to the host device 101, and may transfer a second packet to the host device 101 having switched to the communication mode in accordance with the wake-up request in response to the second packet being received.

In an example in which the provided sleep policy corresponds to the caching sleep policy, the controller 207 may cache a second packet in response to the second packet being received. In this example, the controller 207 may transfer the cached second packet to the host device 101 in response to the host device 101 switching to the communication mode according to expiration of the sleep period. As another example, the controller 207 may transmit a wake-up request to the host device 101, and may transfer the second packet to the host device 101 in response to the host device 101 switching to the communication mode in accordance with the wake-up request. For example, the controller 207 may transmit the wake-up request if an available capacity of a cache storing the cached second packet is less than a predetermined amount.

In an example in which the provided sleep policy corresponds to the semi-caching sleep polity, the controller 207 may cache a second packet, in response to the second packet, excluding real-time data, and a first packet associated with the default operation, being received. In this example, if real-time data is received, or if an available capacity of a cache storing the cached second packet is less than a predetermined amount, the controller 207 may transmit a wake-up request to the host device 101, and may transfer the second packet to the host device 101, having switched to the communication mode in accordance with the wake-up request. Otherwise, the controller 207 may store the second packet in the cache until the host device 101 awakens or until the proxy device 103 determines to wake-up the host device 101.

As described in various examples, in response to the host device 101 switching to the communication mode when the sleep period expires, or in response to a wake-up request transmitted to the host device 101 being received, the controller may transfer a packet received during the sleep period to the host device 101, and may terminate the operation performed by the proxy device 103 instead of the host device 101.

FIG. 3 illustrates an example of a proxy sleep request and a proxy sleep reply.

Referring to FIG. 3, proxy sleep request 301 includes a sleep period 303 and a requested sleep policy 305. The sleep period 303 may refer to a time period during which a host device is to be in a sleep mode. The requested sleep policy 305 may refer to a policy desired to be performed by a proxy device, from a point of view of the host device. For example, the requested sleep policy 305 may correspond to one of a default sleep policy, a caching sleep policy, and a semi-caching sleep policy.

Proxy sleep reply 307 includes a code 309, and a provided sleep policy 311. The code 309 may refer to information about whether a sleep request is accepted by the proxy device, for example, 'acceptance' or 'refusal'. The provided sleep policy 311 may refer to a policy desired to be performed by the proxy device, from a point of view of the proxy device. For example, the provided sleep policy 311 may correspond to one of a default sleep policy, a caching sleep policy, and a semi-caching sleep policy. In this example, the provided sleep policy 311 may be the same as or may be different from the requested sleep policy 305.

FIG. 4 illustrates an example of a method of operating a host device and a proxy device that may save energy through control of a sleep mode.

Referring to FIG. 4, in 401, a host device 101 generates a proxy sleep request to be transmitted to a proxy device 103. For example, the host device 101 may receive an input of a sleep period during which the sleep mode is to be maintained, or an input of a requested sleep policy desired to be performed by the proxy device 103. The host device may transmit, to the proxy device 103, a proxy sleep request including at least one of the input sleep period and the input requested sleep policy.

In 403, the proxy device 103 receives the proxy sleep request from the host device 101, extracts the sleep period and/or the requested sleep policy from the received proxy sleep request, and determines whether the proxy sleep request is accepted based on at least one of the extracted sleep period, the extracted requested sleep policy, and an available capacity of a cache.

In 405, in a case in which the proxy sleep request is determined to be accepted, the proxy device 103 determines a provided sleep policy to be performed when the host device 101 enters the sleep mode. In 407, the proxy device 103 generates a proxy sleep reply as a response to the proxy sleep request. In this example, the proxy device 103 may transmit, to the host device 101, a proxy sleep reply including at least one of information about whether the proxy sleep request is accepted, that is, a code and/or the provided sleep policy.

In 409, the host device 101 receives the proxy sleep reply from the proxy device 103, extracts the code from the received proxy sleep reply, and enters the sleep mode in response to the code corresponding to 'acceptance'.

The host device 101 may further extract the provided sleep policy from the proxy sleep reply, and may display the provided sleep policy. For example, the host device 101 may consider the code 'acceptance' when only the provided sleep policy, excluding the code, is extracted.

The host device 101 having entered the sleep mode may switch to a communication mode, for example, if the sleep period expires, or if a wake-up request is received from the proxy device 103. The host device 101 having switched to the communication mode may receive, from the proxy device 103, a packet received by the proxy device 103 during the sleep period.

In an example in which the proxy sleep request is accepted, the proxy device 103 may perform a default operation including at least one of DAD and NUD.

In an example in which the provided sleep policy corresponds to the default sleep policy, the proxy device 103 may transmit a wake-up request to the host device 101, and may transfer a second packet to the host device 101 having switched to the communication mode in accordance with the wake-up request in response to the second packet being received.

In an example in which the provided sleep policy corresponds to the caching sleep policy, the proxy device 103 may cache a second packet when the second packet is received. In this example, the proxy device 103 may transfer the cached second packet to the host device 101 in response to the host device 101 switching to the communication mode according to expiration of the sleep period. As another example, the proxy device 103 may transmit a wake-up request to the host device 101, and may transfer the second packet to the host device 101 having switched to the communication mode in accordance with the wake-up request.

In an example in which the provided sleep policy corresponds to the semi-caching sleep polity, the proxy device 103 may cache a second packet, excluding real-time data, and a first packet associated with the default operation, in response to the second packet being received. In this example, if the real-time data is received, or if an available capacity of a cache storing the cached second packet is less than a predetermined amount, the proxy device 103 may transmit a wake-up request to the host device 101, and may transfer the second packet to the host device 101 having switched to the communication mode in accordance with the wake-up request. Otherwise the proxy device 103 may store the second packet in a cache until the host device 101 awakens.

By enabling the proxy device 103 to maintain a minimum basic setup for a communication in response to the host device 101 entering a sleep mode, and by omitting an the basic setup operation that is performed when the host device 101 switches to a communication mode, it is possible to resolve an inconvenience experienced when performing the operation. Accordingly, a smooth transition between the sleep mode and the communication mode may be possible, and energy saving may be increased.

In various examples herein, a host device may request to enter sleep mode by transmitting a sleep request to a proxy device. The sleep request may include a desired sleep policy and a sleep period indicating an amount of time that the host device intends to be in sleep mode. The proxy device may decide to accept or refuse the sleep request, for example, based on the desired sleep policy, an amount of memory available, and the like. The proxy device may transmit the acceptance or refusal to the host device via a sleep response.

In some examples, the proxy device may accept the sleep request but attempt to perform a different sleep policy than requested by the host device. In this example, the host device may decide to refuse to enter sleep mode and may find another proxy device to perform the sleep mode with.

Upon switching to a communication mode the host device may omit a basic setup procedure that is typically performed, for example, in IPv6. Accordingly, the host device may transition from sleep mode to communication code at a faster speed, thereby enabling a more efficient use of resources.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, a tablet, a sensor, and devices such as a desktop PC, a high definition television (HDTV), an optical disc player, a setup box, a home appliance, and the like that are capable to of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A host device that is configured to save energy through control of a sleep mode, the host device comprising:
    an interface configured to
        receive, as an input, a requested sleep policy to be performed by a proxy device, and to provide, to the proxy device, a proxy sleep request comprising the requested sleep policy, and
        receive, as an input, a sleep period indicating a duration that the see mode is to be maintained, and to provide the input sleep period to the proxy device by incorporating the sleep period into the proxy sleep request; and
    a processor configured to
        extract, from a proxy sleep reply received from the proxy device in response to the proxy sleep request, information about whether the proxy sleep request is accepted by the proxy device,
        enter the sleep mode in response to the proxy sleep request being accepted,
        maintain the sleep mode for the duration of the sleep period, and
        switch to a communication mode in response to the sleep period expiring or a wake-up request being received from the proxy device.

2. The host device of claim 1, wherein the processor is further configured to extract a sleep policy provided by the proxy device from the proxy sleep reply, and to display the provided sleep policy.

3. The host device of claim 2, wherein the interface is configured to transmit a sleep cancellation request to the proxy device in response to the requested sleep policy being different than the provided sleep policy.

4. The host device of claim 1, further comprising:
entering a sleep mode in response to a code extracted from the received proxy sleep reply, the code corresponding to an acceptance of the proxy sleep request.

5. A proxy device that is configured to save energy through control of a sleep mode, the proxy device comprising:
a determination unit configured to
extract a requested sleep policy from a proxy sleep request received from a host device
extract, from the proxy sleep request, a sleep period indicating a duration that the sleep mode is to be maintained, and
determine whether to accept the proxy sleep request based on the requested sleep policy extracted from the proxy sleep request, and based on the sleep period; and
a controller configured to provide, to the host device, a proxy sleep reply comprising information about whether the proxy sleep request is accepted.

6. The proxy device of claim 5, wherein the determination unit is configured and to determine whether to accept the proxy sleep request based on an available capacity of a cache.

7. The proxy device of claim 6, wherein, in response to the proxy sleep request being accepted,
the determination unit is further configured to determine a sleep policy to provide to the host device when the host device enters the sleep mode, and
the controller is configured to provide the proxy sleep reply to the host device by incorporating the provided sleep policy into the proxy sleep reply.

8. The proxy device of claim 7, wherein, in response to the provided sleep policy being determined to be a default sleep policy, the controller is configured to perform a default operation including at least one of Duplicate Address Detection (DAD) and Neighbor Unreachability Detection (NUD).

9. The proxy device of claim 8, wherein, in response to a packet being received, the controller is configured to transmit a wake-up request to the host device, and transfer the packet to the host device in response to the host device switching to a communication mode.

10. The proxy device of claim 7, wherein, in response to the determination unit determining to provide a caching sleep policy,
the controller is configured to perform a default operation including at least one of DAD and NUD, and
the controller is configured to cache a packet, in response to the packet being received.

11. The proxy device of claim 10, wherein
the controller is configured to transfer the cached packet to the host device, in response to the host device switching to a communication mode at the expiration of the sleep period, and/or
the controller is configured to transmit a wake-up request to the host device, and transfer the cached packet to the host device having switched to the communication mode in accordance with the wake-up request.

12. The proxy device of claim 11, wherein the controller is configured to transmit the wake-up request in response to an available capacity of a cache storing the cached packet being less than a predetermined amount.

13. The proxy device of claim 7, wherein, in response to the determination unit determining to provide a semi-caching sleep policy,
the controller is configured to perform a default operation including at least one of DAD and NUD, and
the controller is configured to cache a packet other than a real-time data packet.

14. The proxy device of claim 13, wherein, in response to the real-time data being received, or in response to an available capacity of a cache storing the cached packet being less than a predetermined amount, the controller is configured to transmit a wake-up request to the host device, and transfer the second packet to the host device having switched to a communication mode in accordance with the wake-up request.

15. A method of a host device that is configured to save energy through control of a sleep mode, the method comprising:
receiving, as an input, a requested sleep policy to be performed by a proxy device, and providing, to the proxy device, a proxy sleep request comprising the requested sleep policy;
receiving, as an input, a sleep period indicating a duration that the sleep mode is to be maintained, and providing the input sleep period to the proxy device by incorporating the sleep period into the proxy sleep request;
extracting, from a proxy sleep reply received from the proxy device in response to the proxy sleep request, information about whether the proxy sleep request is accepted by the proxy device, and entering the sleep mode in response to the proxy sleep request being accepted; and
maintaining the sleep mode for the duration of the sleep period, and switching to a communication mode in response to the sleep period expiring or a wake-up request being received from the proxy device.

16. The method of claim 15, further comprising:
extracting a sleep policy provided by the proxy device from the proxy sleep reply, and displaying the provided sleep policy.

17. A method of a proxy device that is configured to save energy through control of a sleep mode, the method comprising:
extracting a requested sleep policy from a proxy sleep request that is received from a host device;
extracting, from the proxy sleep request, a sleep period indicating a duration that the sleep mode is to be maintained;
determining whether to accept the proxy sleep request based on the requested sleep policy extracted from the proxy sleep request, and based on the sleep period; and
providing, to the host device, a proxy sleep reply including information about whether the proxy sleep request is accepted.

18. The method of claim 17, comprising determining whether to accept the proxy sleep request based on an available capacity of a cache.

19. The method of claim 17, further comprising:
determining a sleep policy to provide the host device when the host device enters the sleep mode, in response to the proxy sleep request being accepted,
wherein the providing comprises providing the proxy sleep reply to the host device by incorporating the provided sleep policy into the proxy sleep reply.

* * * * *